US005315921A

United States Patent [19]

Davis

[11] Patent Number: 5,315,921

[45] Date of Patent: May 31, 1994

[54] METHOD AND APPARATUS FOR DEHYDRATING WASTE FOOD MATERIAL

[75] Inventor: Robert E. Davis, Hinsdale, Ill.

[73] Assignee: R. E. Davis Chemical Corporation, Oak Brook, Ill.

[21] Appl. No.: 814,009

[22] Filed: Dec. 26, 1991

[51] Int. Cl.[5] ............ A47J 37/12

[52] U.S. Cl. ............ 99/407; 99/330; 99/408; 99/516

[58] Field of Search ............ 99/516, 534, 345, 355, 99/407, 403, 330, 408, 510; 241/61, 36

[56] References Cited

U.S. PATENT DOCUMENTS

| | | | |
|---|---|---|---|
| 2,357,566 | 9/1944 | Walter et al. | 99/510 |
| 2,737,129 | 3/1956 | Johnson et al. | 241/38 |
| 2,801,932 | 8/1957 | Witt | 241/38 |
| 2,803,545 | 8/1957 | Randolph | 99/516 |
| 2,873,663 | 2/1959 | Hawk et al. | 99/330 |
| 3,733,998 | 5/1973 | Vischer, Jr. | 99/330 |
| 4,062,277 | 12/1977 | Powers | 99/516 |
| 4,064,796 | 12/1977 | Jones | 99/330 |
| 4,439,459 | 3/1984 | Swartley | 99/330 |
| 4,584,931 | 4/1986 | Feehan | 99/446 |
| 5,066,505 | 11/1991 | Vos et al. | 99/330 |

*Primary Examiner*—Harvey C. Hornsby
*Assistant Examiner*—James F. Hook
*Attorney, Agent, or Firm*—Andrus, Sceales, Starke & Sawall

[57] ABSTRACT

A method and apparatus for dehydrating waste food material. The food material is initially ground to a relatively small particle size and transferred to a porous container or basket in a cooking vessel. The vessel contains a quantity of oil, preferably waste cooking oil, and the oil is maintained at a level beneath the basket. The oil is heated and the heated oil is circulated from the lower end of the vessel and returned to the upper end of the vessel where it flows downwardly through the food material to vaporize the moisture and kill the bacteria in the food material. The circulation of the hot oil is continued for a period sufficient to fully dehydrate the food material and produce a dried product that can be used as an animal feed adjunct.

3 Claims, 1 Drawing Sheet

METHOD AND APPARATUS FOR DEHYDRATING WASTE FOOD MATERIAL

BACKGROUND OF THE INVENTION

Restaurants and fast food establishments generate substantial daily quantities of unsold or unused food materials, which can be in the form of meat products, dairy products, vegetables, bread, condiments, and the like. For example, a fast food establishment will pre-cook certain foods, such as hamburgers, and the like, and if the products are not sold within a specified time period, the food products are scrapped. It has been found that a typical fast food establishment can generate up to 100 lbs. of unsold prepared food a day, which is discarded with other food scraps. This results in a substantial economic loss to the establishment, and as the unsold prepared food contains a substantial percentage of moisture, it has a high volume, and adds considerably to the landfill charges for waste disposal.

Attempts have been made in the past to convert the unsold, prepared food materials into commercial products, such as animal feed. However, due to the high moisture content of the material, these attempts have not been successful. Further, it has been found that certain ingredients in the prepared waste food, such as cheese, are extremely difficult to process to an acceptable end product.

SUMMARY OF THE INVENTION

The invention is directed to a method and apparatus for dehydrating waste food materials, such as unsold prepared foods. The food products can take the form of meat; vegetables, such as lettuce and tomatoes; dairy products, such as cheese; bread; condiments such as mustard, ketchup; and the like.

In accordance with the invention, the food material is initially ground or comminuted to provide an average particle size generally less than one inch. The ground material is then transferred to a porous container or basket, which is mounted within a cooking vessel that contains a quantity of oil. The oil is preferably waste oil that had previously been used in cooking processes in the restaurant or fast food establishment.

The oil is maintained at a level beneath the basket in the vessel, and is heated generally to a temperature in the range of 220° F. to 370° F. The heated oil is withdrawn from the lower end of the vessel and returned to the upper end, flowing downwardly through the food material in the basket to vaporize the water in the material. The circulation of the heated oil is continued for a period of time to fully dehydrate the food material. The resulting dried product is granular, brown in color and resembles toast crumbs. The dried product has a high food value and can be used as an adjunct to animal feed.

Through the invention, the waste food material which is normally scrapped or discarded is utilized to provide a marketable product, thus providing an economic benefit, as well as reducing waste disposal charges.

The high temperature oil acts to kill bacteria in the food material and vaporize the moisture. By eliminating the moisture, a substantial reduction in volume is achieved.

The oil to be used in the process of the invention is preferably waste cooking oil. Thus, the invention also provides a use for the waste oil which would also ordinarily provide a disposal problem.

Other objects and advantages will appear in the course of the following description.

DESCRIPTION OF THE DRAWINGS

The drawing illustrate the best mode presently contemplated of carrying out the invention.

In the drawing.

DESCRIPTION OF THE ILLUSTRATED EMBODIMENT

Figure 1:
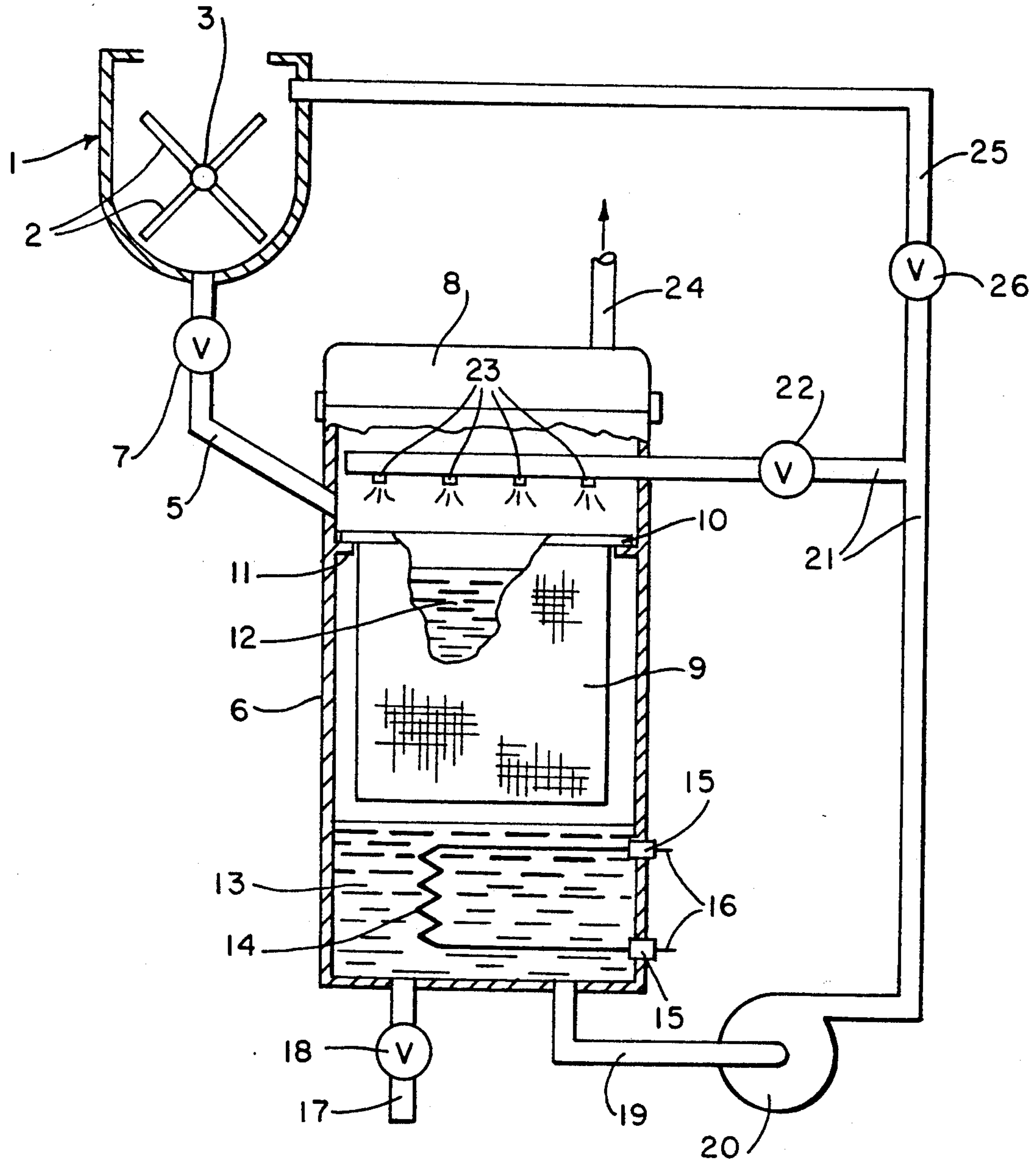
FIG. 1 is a schematic view of the apparatus of the invention.

The drawing illustrates an apparatus that can be used to carry out the process of the invention. In accordance with the invention, a food material is initially fed into a conventional food grinder 1 having a series of grinding blades 2 carried by a rotatable shaft 3, and the blades act to grind or comminute the food material into chunks or particles, generally having an average particle size less than one inch.

The food material is preferably a precooked, unsold food, generated in a restaurant or fast food establishment, and may take the form of meat products; dairy products, such as cheese; vegetables, such as tomatoes or lettuce; bread; condiments, such as mustard and ketchup, and the like.

After the food material has been comminuted to the desired particle size, it is discharged by gravity, or hot oil flush, through conduit 5 to a cooking vessel 6. Valve 7 is located in conduit 5 and controls the flow of material to vessel 6.

While the drawing shows a gravity feed of the material to vessel 6, it is contemplated that other types of feeding systems can be employed, such as a pressurized air blowing system, or a heated oil flush.

Vessel 6 has a removable cover 8, and contains a porous basket or container 9, preferably formed of a material such as stainless steel. The upper edge of basket 9 is formed with a peripheral flange 10, which rests on an internal ledge 11 in vessel 6, thereby maintaining the lower end of the basket a substantial distance above the bottom of the vessel.

The ground food material 12 introduced through conduit 5 to vessel 6 flows into basket 9 to substantially fill the basket.

Vessel 6 contains a quantity of oil 13, and the upper level of the oil is located beneath the lower end of basket 9. Oil 13 is preferably waste cooking oil that has been used in cooking processes in the restaurant or fast food establishment, such as for example, cooking french fries. chicken, or the like. In general, the oil has a boiling point of about 500° F.

The oil 13 in vessel 6 is heated to a temperature beneath its boiling point and generally in the range of about 220° F. to 235° F. The heating can be accomplished by any desired heating mechanism, and as illustrated in the drawings, an electric heating coil 14 is utilized. The ends of the coil extend through sealed fittings 15 to the exterior of the vessel and electrical leads 16 can be connected to a suitable source of electrical power.

A drain line 17 is connected to the lower end of the vessel 6, and a valve 18 is located in drain line 17. By opening valve 18, the oil 13 in vessel 1 can be removed.

The heated oil is adapted to be circulated through the food material 12 contained in basket 9. To provide the circulation, one end of a conduit 19 is connected to the lower end of vessel 6, while the opposite side of the conduit communicates with the suction side of a pump 20. The discharge side of pump 20 is connected through conduit 21 to the upper end of vessel 6, and a valve 22 is located in conduit 21 to control the flow of heated oil through the conduit.

Mounted within the portion of conduit 21 located within vessel 6 are a plurality of spray nozzles 23, and the heated oil being circulated through conduit 21 is discharged downwardly through nozzles 23 into contact with the ground food material 12 in basket 9.

The heated oil flowing downwardly through the food material is at a temperature above the boiling point of water, thereby vaporizing the water or moisture in the food material. The water vapor or steam is discharged from the upper end of the vessel through a vent 24, which is mounted in cover 8. The flow of heated oil through the basket 9 is continued until no further steam or water vapor is discharged through vent 24, thus indicating that the food product has been substantially fully dehydrated.

As a further aspect of the invention a bypass conduit 25 can be connected between conduit 21 and grinder 1 and a valve 26 is mounted in conduit 25. By closing valve 22 and opening valve 26, the heated oil will be circulated to the grinder to flush food particles from the grinder 1, and the circulating oil carrying the food particles will be returned through conduit 5 to vessel 6.

By grinding the food material, the overall surface area is increased, which facilitates evaporation of water from the food material. It has been found that the food material can be fully dehydrated by the circulating oil in a period of about twenty minutes.

The resulting dried or dehydrated food product has a relatively small particle size and is generally brown in color, having an appearance similar to toast crumbs. During the dehydration process, a small portion of the oil may be absorbed in the food material, which can increase the fat content of the dried product to a minor degree. The dried product has a high food value and can be used as an adjunct to animal feed.

Through the use of the invention, the waste, precooked food materials that would ordinarily be discarded are employed to generate a marketable product. By converting the food material to a marketable product, the volume of discarded food material is substantially decreased which correspondingly reduces landfill charges for disposal.

As a further advantage, the used cooking oil of the restaurant or fast food establishment is employed as the heating medium which eliminates the need of disposal of the waste oil. The heated oil not only dehydrates the food material, but also acts to kill bacteria that may be present in the foods to provide a sterile product.

Various modes of carrying out the invention are contemplated as being within the scope of the following claims particularly pointing out and distinctly claiming the subject matter which is regarded as the invention.

I claim:

1. An apparatus for dehydrating waste food material containing moisture, comprising comminuting means for comminuting a food material containing moisture to provide food particles, a vessel having an inlet, a porous support disposed within the vessel and having an opening communicating with said inlet, conduit means connecting said comminuting means and said vessel for conducting comminuted food material from said comminuting means to the inlet of the vessel and into said porous support, circulating conduit means connecting the lower portion of the vessel to the upper portion of the vessel, means for flowing a non-aqueous liquid through said circulating conduit means with the liquid flowing downwardly in contact with the food material in said porous support, heating means for heating the liquid, said heated liquid acting to vaporize the moisture in said food material to provide a dry finely divided product, by-pass conduit means connecting said circulating conduit means with said comminuting means for supplying said liquid to said comminuting means and flushing comminuted food material from said comminuting means, and valve means disposed in said by-pass conduit means for controlling the flow of liquid therein.

2. The apparatus of claim 1, and including vent means in the upper end of said vessel for venting vaporized moisture from said vessel.

3. An apparatus for dehydrating waste food material comprising, comminuting means for comminuting waste food material containing moisture to provide food particles, a closed vessel having an inlet in the upper portion thereof, a porous basket removably supported in the vessel and having an open upper end communicating with said inlet, conduit means connecting said comminuting means and said inlet for conducting comminuted food material from said comminuting means to said vessel and into said basket, flow control means disposed in said conduit means for controlling the flow of food material through said conduit means, a quantity of oil disposed in the lower end of said vessel beneath the basket, heating means for heating the oil in said vessel, circulating conduit means connecting the lower end of said vessel to the upper portion of said vessel above the level of said basket, means for continuously flowing heated oil from the lower end of the vessel through said circulating conduit means to the upper end of said vessel, means for discharging the heated oil from the circulating conduit means downwardly through the food material in the basket to thereby dehydrate the moisture in said food material and provide a dry finely divided product, and by-pass conduit means providing communication between said vessel and said comminuting means for supplying heated oil to said comminuting means and flushing comminuted food material from said comminuting means.

* * * * *